(12) United States Patent
Kawasaki et al.

(10) Patent No.: US 8,369,193 B2
(45) Date of Patent: Feb. 5, 2013

(54) OPTICAL PICKUP APPARATUS AND MANUFACTURING METHOD OF OPTICAL PICKUP APPARATUS

(75) Inventors: Ryoichi Kawasaki, Isesaki (JP); Tohru Hotta, Okaya (JP)

(73) Assignees: Sanyo Electric Co., Ltd., Osaka (JP); Sanyo Optec Design Co., Ltd., Tokyo (JP)

( * ) Notice: Subject to any disclaimer, the term of this patent is extended or adjusted under 35 U.S.C. 154(b) by 178 days.

(21) Appl. No.: 12/859,123

(22) Filed: Aug. 18, 2010

(65) Prior Publication Data

US 2011/0209164 A1 Aug. 25, 2011

(30) Foreign Application Priority Data

Aug. 19, 2009 (JP) .................................. 2009-190379

(51) Int. Cl.
*G11B 7/00* (2006.01)
(52) U.S. Cl. .................. 369/44.14; 369/112.24
(58) Field of Classification Search ............. 369/112.23, 369/112.24, 44.37, 44.14, 44.15, 44.32, 53.19, 369/94, 44.23
See application file for complete search history.

(56) References Cited

U.S. PATENT DOCUMENTS

| | | | | |
|---|---|---|---|---|
| 2004/0114495 A1* | 6/2004 | Kim et al. | ................. | 369/112.24 |
| 2005/0286355 A1* | 12/2005 | Kim et al. | ................. | 369/44.14 |
| 2006/0018214 A1* | 1/2006 | Fujii et al. | ................. | 369/112.01 |
| 2008/0095019 A1* | 4/2008 | Hatano et al. | ............ | 369/112.24 |
| 2008/0095020 A1* | 4/2008 | Takahashi et al. | ........ | 369/112.24 |
| 2008/0137518 A1* | 6/2008 | Horiguchi | ................. | 369/112.24 |
| 2009/0034402 A1* | 2/2009 | Wakabayashi et al. | .. | 369/112.24 |
| 2010/0067356 A1* | 3/2010 | Fujii et al. | ................. | 369/112.24 |
| 2010/0271927 A1* | 10/2010 | Furuichi | ................. | 369/112.24 |

FOREIGN PATENT DOCUMENTS

JP 2008-65889 3/2008

* cited by examiner

*Primary Examiner* — Thang Tran

(74) *Attorney, Agent, or Firm* — SoCal IP Law Group LLP; Steven C. Sereboff; John E. Gunther

(57) ABSTRACT

An optical-pickup apparatus includes: a first-objective lens; a second-objective lens; a lens holder including a first-lens barrel having the first-objective lens mounted on an end face thereof and a second-lens barrel having the second-objective lens mounted on an end face thereof; an actuator unit having the lens holder mounted thereon; and a housing having the actuator unit mounted thereon, the first and second objective lenses each being mounted on the lens holder such that a direction, in which wavefront of coma aberration on each lens face is most advanced in phase, is aligned with a radial direction of an information-recording medium, the actuator unit being mounted on the housing such that an optical axis of the first-objective lens is inclined in the radial direction at an inclination angle of the axis toward a recording surface of the medium required to cancel coma aberration of the first-objective lens to the surface.

14 Claims, 11 Drawing Sheets

OPTICAL PICKUP APPARATUS AND MANUFACTURING METHOD OF OPTICAL PICKUP APPARATUS

CROSS-REFERENCE TO RELATED APPLICATION

This application claims the benefit of priority to Japanese Patent Application No. 2009-190379, filed Aug. 19, 2009, of which full contents are incorporated herein by reference.

BACKGROUND OF THE INVENTION

1. Field of the Invention

The present invention relates to an optical pickup apparatus and a manufacturing method of the optical pickup apparatus, and, more particularly, to an art of properly correcting coma aberration of each of a plurality of lenses incorporated in an optical pickup apparatus in a simple manufacturing/adjustment process.

2. Description of the Related Art

It is known that an objective lens, which is mounted on an optical pickup apparatus and is used for recording/reproduction for an optical disc compatible with the BD (Blu-ray Disc) standard, the HD-DVD (High Definition Digital Versatile Disc) standard, etc., has great coma aberration caused by deviation between an incidence plane top and an emitting plane top, irrespective of its material (made of glass, made of a resin, etc.). FIG. 12 exemplifies a relationship between an amount of deviation of the plane top and coma aberration in the objective lens, and as shown in this drawing, in the objective lens to be used for the BD standard in this example the coma aberration of 40 mλrms occurs with respect to the deviation of the plane top of 1 μm.

The WDs (Working Distances) of the objective lenses to be used for the optical pickup apparatus are not necessarily the same and varies with types of the optical discs, and for example, the optical pickup apparatus supporting both of the BD-standard optical disc and the CD/DVD-standard optical disc is required to provide two objective lenses, one for the BD standard disc and the other for the CD/DVD standard disc. In such a pickup apparatus, an optical axis adjustment should be performed to properly correct the coma aberration with respect to individual objective lenses at the time of manufacturing (see Japanese Laid-Open Patent Publication No. 2008-65889, for example).

In the art disclosed in the above publication, a holder for adjusting the optical axis is individually provided for each objective lens so as to properly correct the coma aberration of each objective lens. Therefore, the structure of the optical pickup apparatus becomes complicated when the art in the above publication is employed. In the case of employing the art in the above publication, the optical axis adjustment of each objective lens is required to be individually performed, and thus, it is inevitable that manufacturing/adjustment process of the optical pickup apparatus becomes complicated. The objective lens to be used for the recording/reproduction for the optical disc compatible with the BD standard, HD-DVD standard, etc., has greater coma aberration than that of the objective lens to be used for the recording/reproduction for the optical disc compatible with the DVD/CD standard, and thus, an accurate work is required at the time of manufacturing/adjustment, thereby increasing load of manufacturing.

SUMMARY OF THE INVENTION

An optical pickup apparatus according to an aspect of the present invention, which applies a light flux to an information recording medium to be rotated and detect the light flux reflected from the information recording medium comprises: a first objective lens configured to focus the light flux on the information recording medium; a second objective lens configured to focus the light flux on the information recording medium; a lens holder including a first lens barrel having the first objective lens mounted on an end face thereof and a second lens barrel having the second objective lens mounted on an end face thereof; an actuator unit having the lens holder mounted thereon; and a housing having the actuator unit mounted thereon, the first objective lens and the second objective lens each being mounted on the lens holder such that a direction, in which wavefront of coma aberration on each lens face is most advanced in phase, is aligned with a radial direction of the information recording medium, the actuator unit being mounted on the housing such that an optical axis of the first objective lens is inclined in the radial direction at an inclination angle of the optical axis thereof toward a recording surface of the information recording medium which angle is required to cancel coma aberration of the first objective lens to the recording surface.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

A best mode of carrying out the invention will hereinafter be described. An optical pickup apparatus 1 according to an embodiment of the present invention is an apparatus that emits a light flux to an information recording medium 5 to be rotated and detects the light flux reflected from the information recording medium 5. The optical pickup apparatus 1 is mounted on an information recording/reproducing device such as an optical disc device 500, which will be described later.

The information recording medium 5, in which or from which information is recorded or reproduced with the optical pickup apparatus 1 according to an embodiment of the present invention is an optical disc (first optical disc) of the BD (Blu-ray Disc) standard or the HD-DVD (High Definition Digital Versatile Disc) standard, an optical disc (second optical disc) of the CD (Compact Disc) standard, and an optical disc (third optical disc) of the DVD (Digital Versatile Disc) standard, for example.

First Embodiment

Figure 1:
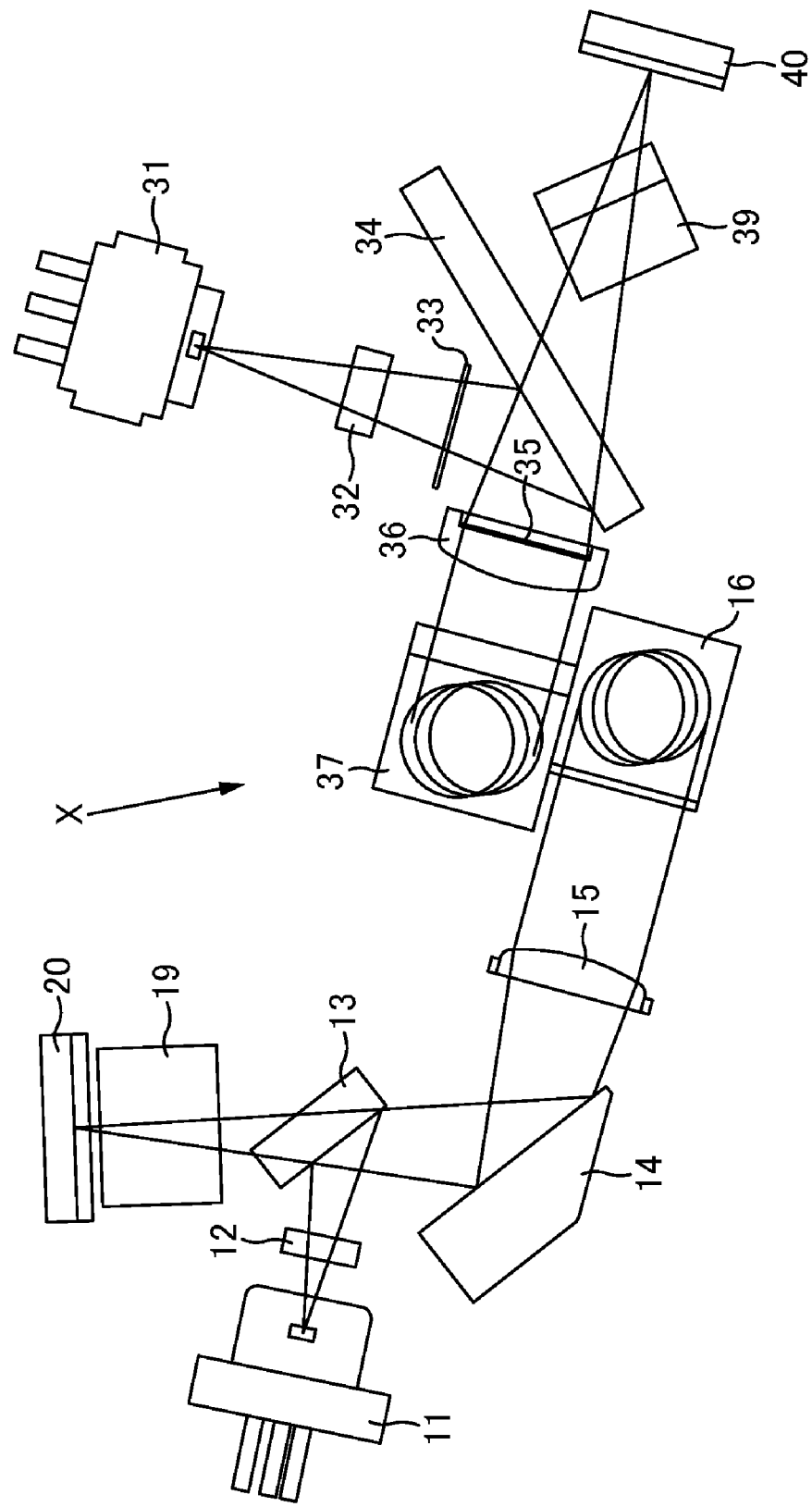
FIG. 1 is a diagram illustrating a configuration of an optical system of an optical pickup apparatus 1.
Figure 2:
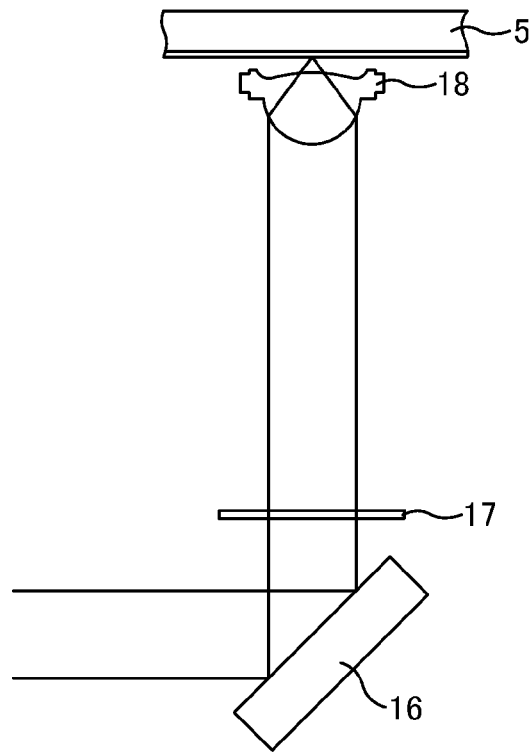
FIG. 2 is an explanatory diagram illustrating a configuration of a first optical system of an optical pickup apparatus 1.
Figure 3:
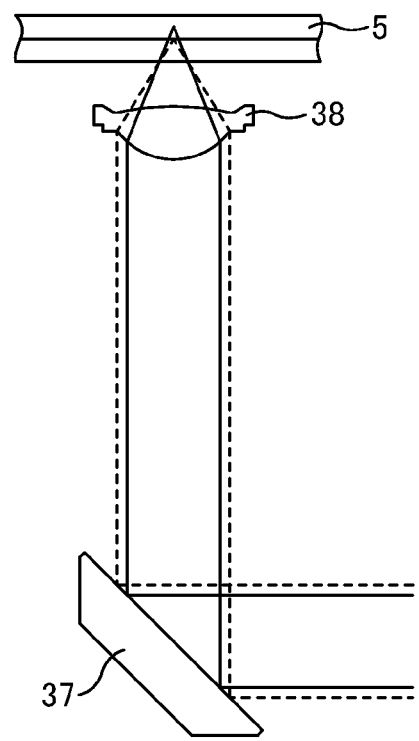
FIG. 3 is an explanatory diagram illustrating a configuration of a second optical system of an optical pickup apparatus 1.

FIGS. 1 to 3 depict a configuration of an optical system of the optical pickup apparatus 1 to be used for signal reproduction or signal recording of the optical disc, which will be described as a first embodiment. The optical system of the optical pickup apparatus 1 includes a first optical system, which is an optical system for the first optical disc, and a second optical system, which is an optical system for the second optical disc and the third optical disc. In these optical systems, the first optical system constitutes an optical system for the recording/reproduction of the optical disc of the BD standard or the HD-DVD standard, for example, and the second optical system constitutes an optical system for the recording/reproduction of the optical disc of the CD standard and the DVD standard, for example. An arrow X shown in FIG. 1 represents a radial direction of the information recording medium 5. A rotation center of the information recording medium 5 lies in a +X direction. The first optical system will firstly be described.

The first optical system is configured including a first laser beam emitter 11, a first diffraction grating 12, a first beam splitter 13, a first reflective mirror 14, a first collimating lens 15, a first raising mirror 16, a first quarter-wave plate 17, a first objective lens 18, a first sensor lens 19 (detecting lens), and a first photodetector 20.

The first laser beam emitter 11 emits a first laser beam having a first wavelength (e.g., blue light of 405 nm). The first laser beam emitter 11 is configured using a light-emitting device such as a semiconductor laser, etc.

The first laser beam emitted from the first laser beam emitter 11 enters the first diffraction grating 12. The first diffraction grating 12 includes: as its constituent elements, a diffraction grating that splits the first laser beam into 0th-order light, +1st-order diffracted light, and −1st-order diffracted light; and a half-wave plate that converts the polarization direction of the first laser beam, which is a linearly-polarized beam, into a predetermined direction.

The first beam splitter 13 reflects the first laser beam incident from the first diffraction grating 12, and passes return light incident from the first reflective mirror 14. The first reflective mirror 14 reflects the first laser beam incident from the first beam splitter 13 in the direction of the first collimating lens 15.

The first collimating lens 15 converts the first laser beam incident from the first reflective mirror 14 into parallel light. The first laser beam (parallel light) converted by the first collimating lens 15 is incident on the first raising mirror 16. The first raising mirror 16 reflects the first laser beam incident from the first collimating lens 15 in a direction perpendicular to a recording surface of the optical disc.

As shown in FIG. 2, the first laser beam reflected by the first raising mirror 16 in the direction perpendicular to the recording surface of the optical disc enters the first quarter-wave plate 17. The first laser beam is converted by the first quarter-wave plate 17 from the linearly-polarized light to circularly-polarized light.

The first laser beam having passed through the first quarter-wave plate 17 (circularly-polarized light) enters the first objective lens 18. The first objective lens 18 focuses the incident first laser beam (circularly-polarized light) on a signal recording layer of the optical disc.

In the first optical system with the above configuration, the return light of the first laser beam, which is focused by the first objective lens 18 to be incident on the signal recording layer of the optical disc, is converted by the first objective lens 18 into the parallel light, and enters the first quarter-wave plate 17 and is converted by the first quarter-wave plate 17 from the circularly-polarized light to the linearly-polarized light (direction opposite to that at the time of entering from the first raising mirror 16). The return light that has become the linearly-polarized light enters the first beam splitter 13 via the first raising mirror 16, the first collimating mirror 15, and the first reflective mirror 14.

The return light incident on the first beam splitter 13 passes through the first beam splitter 13 and passes through the first sensor lens 19, to enter the first photodetector 20. The first sensor lens 19 focuses the return light on the first photodetector 20 as well as causes astigmatism to the return light, to generate a focus error signal. For example, a cylindrical face, a flat face, a concave curved face, or a convex curved face is formed on an incidence plane side or an emitting plane side of the first sensor lens 19.

The first photodetector 20 has photodetection areas obtained by being divided into a plurality of areas (e.g., light receiving areas of three laser beams, obtained by being divided by the first diffraction grating 12, each are divided into four). The first photodetector 20 is configured using a light receiving element such as a photodiode. A signal reproduction operation and a signal recording operation based on a signal detected by the first photodetector 20, a method of processing a signal detected by the first photodetector 20, a tracking error detection method by the DPP (Differential Push Pull), etc., and a focus error detection method by an astigmatism method, etc., and the like are all known and therefore, details thereof are omitted.

The second optical system will then be described. The second optical system is configured including a second laser beam emitter 31, a second diffraction grating 32, a half-wave plate 33, a second beam splitter 34, a second quarter-wave plate 35, a second collimating lens 36, a second raising mirror 37, a second objective lens 38, a second sensor lens 39 (detecting lens), and the second photodetector 40.

The second laser beam emitter 31 emits a second laser beam having a second wavelength (e.g., infrared light of 780 nm) and a third laser beam of a third wavelength (e.g., red light of 650 nm). The second laser beam emitter 31 is configured using a semiconductor laser (light-emitting device) such as a dual-wavelength laser diode, etc.

The second laser beam or the third laser beam emitted from the second laser beam emitter 31 enters the second diffraction grating 32. The second diffraction grating 32 splits the incident laser beam into 0th-order light, +1st-order diffracted light, and −1st-order diffracted light.

The second laser beam or the third laser beam having passed through the second diffraction grating 32 enters the half-wave plate 33. The half-wave plate 33 converts the direction of the linearly-polarized light of the incident second laser beam or third laser beam to a direction suitable for being split by the second beam splitter 34.

The second beam splitter 34 reflects the second laser beam or the third laser beam incident from the half-wave plate 33, and passes return light incident from the second quarter-wave plate 35.

The second laser beam or the third laser beam reflected by the second beam splitter 34 enters the second quarter-wave plate 35. The second quarter-wave plate 35 converts the incident laser beam from the linearly-polarized light into the circularly-polarized light. The second quarter-wave plate 35 is mounted on one surface of the second collimating lens 36, as will be described later.

The second collimating lens 36 converts the incident second laser beam or third laser beam, having passed through the second quarter-wave plate 35 after having been reflected by the second beam splitter 34, into the parallel light, and allows the beam to be incident on the second raising mirror 37.

The second raising mirror 37 reflects the incident second laser beam or third laser beam in the direction perpendicular to the recording surface of the optical disc. As shown in FIG. 3, the second laser beam or the third laser beam reflected by the second raising mirror 37 enters the second objective lens 38. The second objective lens 38 focuses the incident second laser beam or third laser beam on the signal recording layer of the optical disc.

In the second optical system with the above configuration, the return light of the second laser beam or the third laser beam, focused by the second objective lens 38 to be incident on the signal recording layer of the optical disc, is converted by the second objective lens 38 into the parallel light, and thereafter, enters the second beam splitter 34 via the second raising mirror 37, the second collimating mirror 36, and the second quarter-wave plate 35. The return light, entering the second beam splitter 34, passes through the second beam splitter 34, passes through the second sensor lens 39, and finally enters the second photodetector 40.

The second sensor lens 39 focuses the return light on the second photodetector 40, as well as causes the astigmatism to the return light, to generate the focus error signal. For example, a cylindrical face, a flat face, a concave curved face, or a convex curved face is formed on an incidence plane side or an emitting plane side of the second sensor lens 39.

The second photodetector 40 has photodetection areas obtained by being divided into a plurality of areas (e.g., the light receiving areas of the three laser beams, obtained by being divided by the second diffraction grating 32 each are divided into four). The second photodetector 40 is configured using the light receiving element such as a photodiode, etc. A signal reproduction operation and a signal recording operation based on a signal detected by the second photodetector 40, a method of processing a signal detected by the second photodetector 40, a tracking error detection method by the DPP (Differential Push Pull), etc., and a focus error detection method by an astigmatism method, etc., and the like are all known and therefore, details thereof are omitted.

Figure 4:
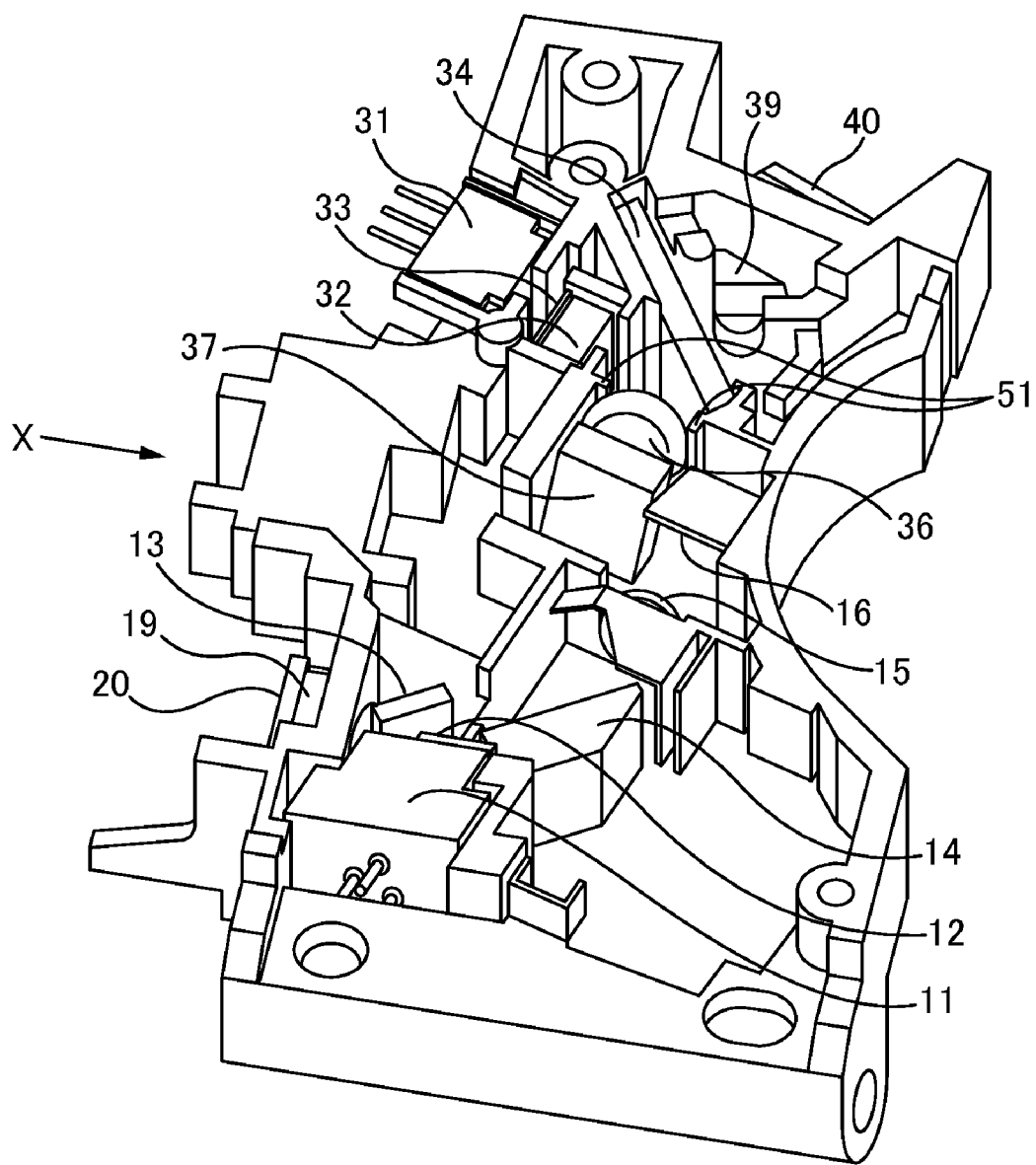
FIG. 4 is a perspective view illustrating an appearance of a housing 50 and an optical system mounted thereon.

FIG. 4 is a perspective view illustrating a state where the optical system with the above configuration is mounted on a housing 50 made of a material such as metal and resin. An arrow X in FIG. 4 represents the radial direction of the information recording medium 5. The rotation center of the information recording medium 5 lies in the +X direction.

As shown in FIG. 4, constituent elements of the optical system of the optical pickup apparatus 1 are provided at predetermined locations of the housing 50 so that these components are in such a positional relationship as shown in FIGS. 1 to 3. The constituent elements of the optical system are provided on the housing 50 by being bonded to or fitted into a convex part, a partition plate, etc., provided in the housing 50.

Figure 5:
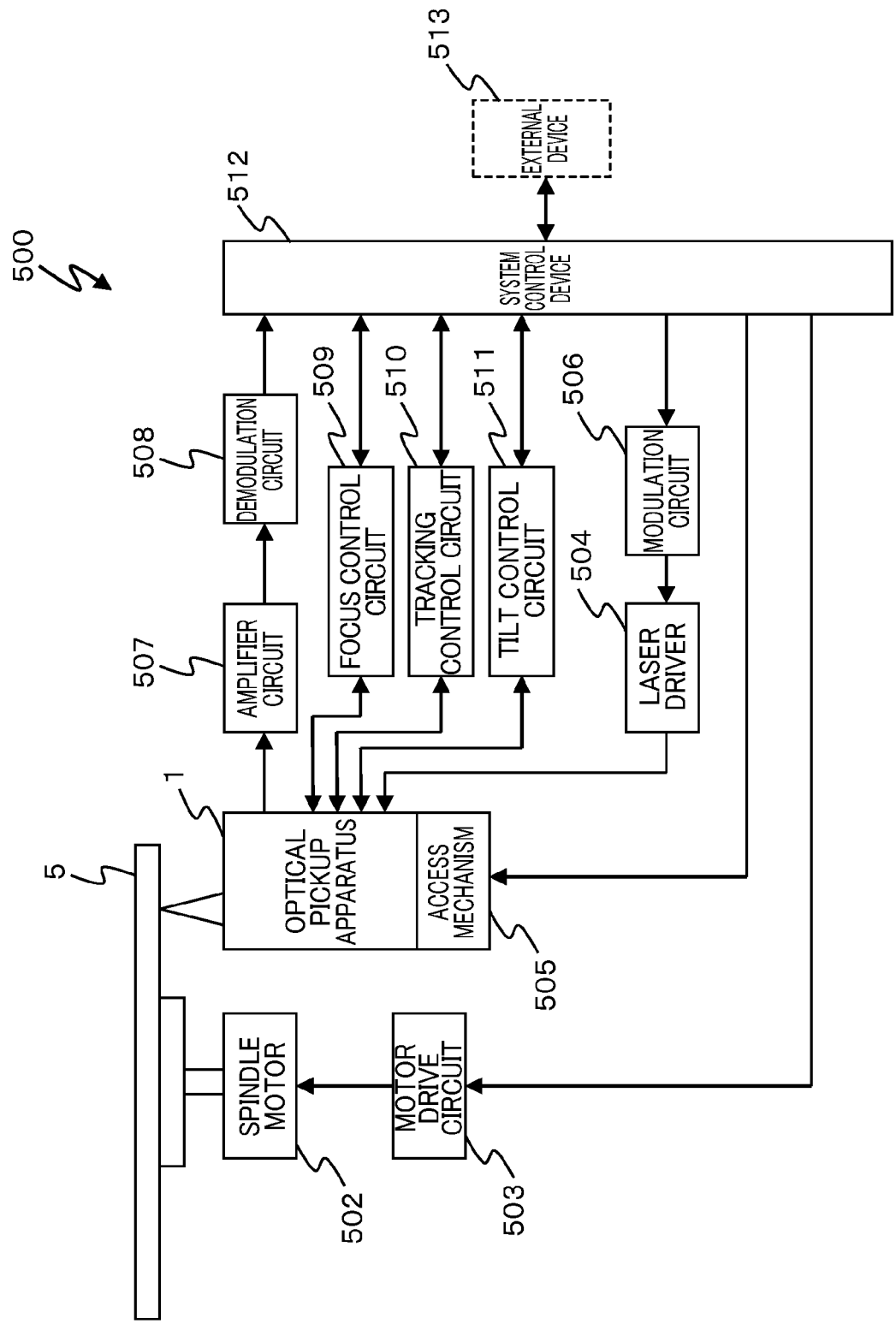
FIG. 5 is a block diagram illustrating one example of an optical disc device 500.

FIG. 5 is a block diagram illustrating one example of the optical disc device 500 configured using the optical pickup apparatus 1 described above. As shown in FIG. 5, this optical disc device 500 includes, in addition to the optical pickup apparatus 1 with the configuration described above, a spindle motor 502, a motor drive circuit 503, a laser driver 504, an access mechanism 505, a modulation circuit 506, an amplifier circuit 507, a demodulation circuit 508, a focus control circuit 509, a tracking control circuit 510, a tilt control circuit 511, a system control device 512, and an external device 513.

The spindle motor 502 rotates the information recording medium 5. The motor drive circuit 503 controls the rotation of the spindle motor 502 according to a control signal sent from the system control device 512.

The access mechanism 505 moves the optical pickup apparatus 1 in the radial direction of the information recording medium 5 according to the control signal sent from the system control device 512.

The laser driver 504 controls the emission of the laser beam from the first laser beam emitter 11 and the second laser beam emitter 31 according to a signal input from the modulation circuit 506. The modulation circuit 506 modulates data to be recorded in the information recording medium 5 which is input from the system control device 512, into a pulse signal for recording. The data to be recorded in the information recording medium 5 is supplied, as needed, from the external device 513 such as a personal computer via the system control device 512, for example.

The amplifier circuit 507 amplifies an RF (Radio Frequency) signal contained in an electric signal output from the first photodetector 20 or the second photodetector 40 of the optical pickup apparatus 1, and outputs the amplified signal to the demodulation circuit 508. The demodulation circuit 508 demodulates the RF signal input from the amplifier circuit 507, and outputs the demodulated signal to the system control device 512. The system control device 512 outputs, to the external device 513, a data signal based on the demodulated signal input from the demodulation circuit 508.

The focus control circuit 509, the tracking control circuit 510, and the tilt control circuit 511 perform drive control for the first objective lens 18 and the second objective lens 38.

The focus control circuit 509 in the above circuits detects a focus error signal contained in the electrical signal output from the first photodetector 20 or the second photodetector 40 in the optical pickup apparatus 1, and performs focus control for the first objective lens 18 and the second objective lens 38 based on the detected focus error signal.

The tracking control circuit 510 detects a tracking error signal contained in the electrical signal output from the first photodetector 20 or the second photodetector 40 in the optical pickup apparatus 1, and performs tracking control for the first objective lens 18 and the second objective lens 38 based on the detected tracking error signal.

The tilt control circuit 511 detects a tilt error signal contained in the electrical signal output from the first photodetector 20 or the second photodetector 40 in the optical pickup apparatus 1, and performs tilt control for the first objective lens 18 and the second objective lens 38 based on the detected tilt error signal.

Figure 6:
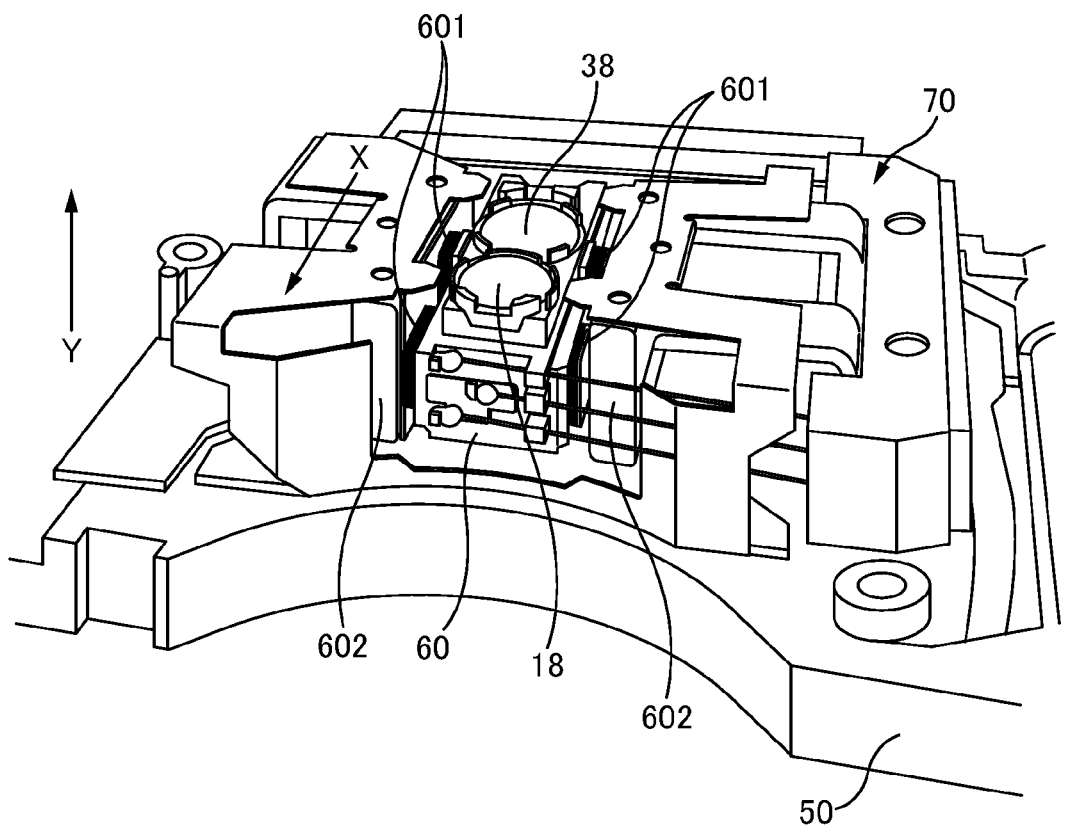
FIG. 6 is a perspective view illustrating a structure around a first objective lens 18 and a second objective lens 38.

FIG. 6 is a perspective view illustrating a structure around the first objective lens 18 and the second objective lens 38 in the optical pickup apparatus 1. The structure shown in FIG. 6 is provided on the back side of the housing 50 shown in FIG. 4. An arrow Y in FIG. 6 represents the direction perpendicular to the recording surface of the information recording medium 5. The recording surface of the information recording medium 5 lies in a +Y direction.

As shown in FIG. 6, the first objective lens 18 and the second objective lens 38 are mounted at predetermined locations in one lens holder 60. A variety of coils 601 (focusing coil, tracking coil, and tilt coil), a mechanism (not shown) for supplying an electric current to each coil 601, a magnet 602 for supplying a magnetic field to each coil 601, etc., are arranged in or around the lens holder 60. As shown in FIG. 6, lens holder 60, the coils 601, and the magnets 602 are unitized as one unit (hereinafter, this unit is referred to as an actuator unit 70).

The lens holder 60 is fixed to the actuator unit 70, after the first objective lens 18 and the second objective lens 38 is fixed at the predetermined locations in the lens holder 60. The actuator unit 70 is fixed to the housing 50, after the lens holder 60 is fixed thereto. When the first objective lens 18 and the second objective lens 38 are fixed to the lens holder 60 and when the actuator unit 70 is fixed to the housing 50, an autocollimator, a gonio stage, etc., are used to adjust the optical axis of the first objective lens 18 and the second objective lens 38.

The first objective lens 18 and the second objective lens 38 are fixed to the lens holder 60 and the actuator unit 70 is fixed to the housing 50 by bonding with an adhesive agent such as a thermosetting adhesive agent. However, this is not limited thereto and they are fixed by such a method as fitting, instead of or in combination with the bonding.

Figure 7A:
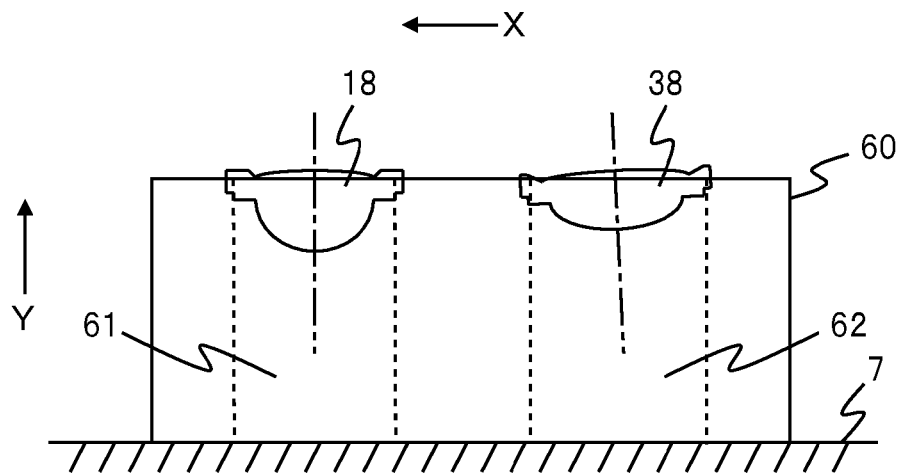
FIG. 7A is a typical side view illustrating a state where a first objective lens 18 and a second objective lens 38 are mounted on a lens holder 60.

FIG. 7A is a typical side view illustrating a state where the first objective lens 18 and the second objective lens 38 are mounted on the lens holder 60. An arrow X in FIG. 7A represents the radial direction of the information recording medium 5. In a state where the lens holder 60 is built into the optical pickup apparatus 1, the rotation center of the information recording medium 5 lies in the +X direction. An arrow Y in FIG. 7A represents the direction perpendicular to the recording surface of the information recording medium 5. In the state where the lens holder 60 is built into the optical pickup apparatus 1, the information recording medium 5 lies on the +Y side relative to the lens holder 60 and the housing 50 lies on the −Y side relative to the lens holder 60. In FIG. 7A, the inclination angles of the first objective lens 18 and the second objective lens 38 is illustrated more emphatically than the actual angles.

As shown in FIG. 7A, a first lens barrel 61 constituting a light path of the first optical system described above and a second lens barrel 62 constituting the light path of the second optical system described above are provided at the predetermined locations in the lens holder 60. The lens holder 60 is run through in the ±Y directions to form each of the first lens barrel 61 and the second lens barrel 62. Each of the first lens barrel 61 and the second lens barrel 62 is formed so that its optical axis is oriented in the vertical direction.

The first objective lens 18, which is a constituent element of the first optical system, is mounted on an end face (+Y side) of the lens barrel 61 which faces the information recording medium 5. The second objective lens 38, which is a constituent element of the second optical system, is mounted on an end face (+Y side) of the lens barrel 62 which faces the information recording medium 5.

At the end face of the first lens barrel 61 of the lens holder 60, an attachment portion not shown is provided for fixing the first objective lens 18. The attachment portion is in a mortar shape or a spherical shape, for example. A holding portion for holding the rim of the first objective lens 18 or the second objective lens 38 and a protrusion (dowel) for adjustment are formed, for example, around the attachment portion.

Each of the first objective lens 18 and the second objective lens 38 is fixed to the lens holder 60 such that the direction, in which wavefront of coma aberration (third-order (third order with respect to a product of an angle α with the optical axis and a distance r from the optical axis) coma aberration) on each lens face is most advanced in phase, is aligned with the direction of the rotation center of the information recording medium 5. That is, each of the first objective lens 18 and the second objective lens 38 is fixed to the lens holder 60 such that the direction, in which wavefront of coma aberration on each lens face is most advanced in phase, is directed in the direction of the rotation center of the information recording medium 5. The direction, in which the wavefront of the coma aberration is most advanced in phase, can be identified based on contents of a test result certificate of the objective lens, etc., for example.

The first objective lens 18 is fixed to the lens holder 60 such that the direction of the optical axis thereof toward the recording surface of the information recording medium 5 coincides with the optical axis of the first lens barrel 61. On the other hand, the second objective lens 38 is fixed to the lens holder 60 such that the optical axis of the lens toward the recording surface of the information recording medium 5 becomes in the following direction.

That is, assuming that an inclination angle of the optical axis of the first objective lens 18 required to cancel the coma aberration of the first objective lens 18 to the recording surface of the information recording medium 5 is a first inclination angle, and that an inclination angle of the optical axis of the second objective lens 38 required to cancel the coma aberration of the second objective lens 38 to the recording surface of the information recording medium 5 is a second inclination angle (first inclination angle>second inclination angle), the second objective lens 38 is mounted on the lens holder 60 such that the optical axis of the lens is inclined in the direction of the rotation center (+X direction) of the information recording medium 5 at an angle corresponding to a difference between the first inclination angle and the second inclination angle (first inclination angle minus second inclination angle), relative to the optical axis of the second lens barrel 62.

The optical axis adjustment of the first objective lens 18 and the second objective lens 38 is performed with the lens holder 60 being fixed such that the optical axis of the first lens barrel 61 and the optical axis of the second lens barrel 62 are oriented in the vertical direction by placing the lens holder 60 on a horizontal face 7 or fixing the lens holder 60 by a jig, etc., for example.

Figure 8:
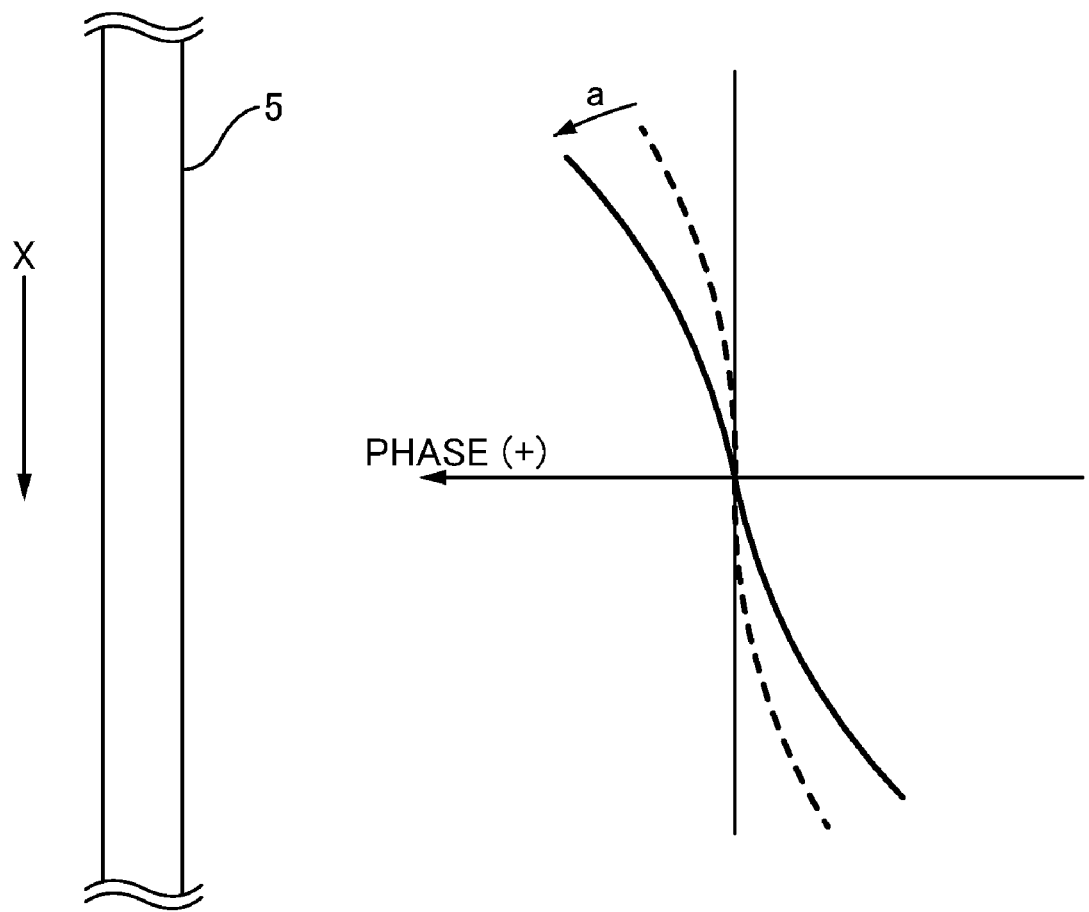
FIG. 8 is an explanatory diagram illustrating a mechanism for canceling coma aberration of an objective lens by inclining an optical axis of an objective lens.

Here, the coma aberration of the objective lens can be canceled by inclining the optical axis to the side on which the coma aberration is advanced in phase, as described above. FIG. 8 is an explanatory diagram illustrating a mechanism for canceling the coma aberration of the objective lens by inclining the optical axis of the objective lens. In FIG. 8, a vertical axis represents a radius (distance from the center of the objective lens (origin point is the center of the lens)) of the objective lens, and the horizontal axis represents a phase (λ) of the wavefront of the coma aberration. As shown in FIG. 8, by inclining the optical axis of the objective lens in the direction indicated by a character a, the phase of the wavefront aberration can be corrected from the phase indicated by a solid line to the phase indicated by a broken line (planarizing of the phase of the wavefront aberration), so that the coma aberration can be cancelled.

The change in the coma aberration to the inclination angle of the optical axis of the objective lens is maximized when the optical axis is inclined in the direction in which the wavefront of the coma aberration is most advanced in phase. In an embodiment of the present invention, each of the first objective lens 18 and the second objective lens 38 is fixed to the lens holder 60 such that the direction, in which the wavefront of the coma aberration on each lens face is most advanced in phase coincides with the direction of the rotation center of the information recording medium 5, and thus, the coma aberration can effectively be canceled with a minimal inclination angle. This makes it possible to cancel the coma aberration efficiently, while minimizing a decrease in optical efficiency (e.g., decrease in light amount) caused by the inclination of the optical axis of the objective lens.

Figure 7B:
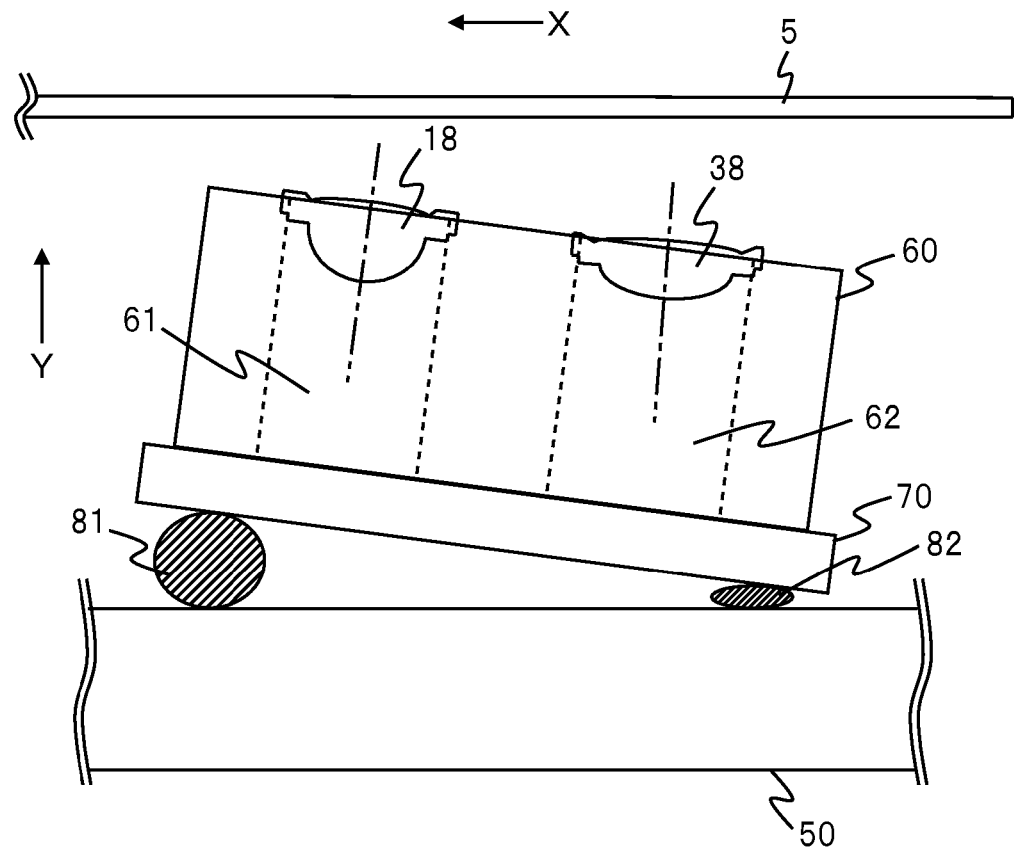
FIG. 7B is a typical side view illustrating a state where a lens holder 60 having a first objective lens 18 and a second objective lens 38 mounted thereon is mounted on an actuator unit 70, and an actuator unit 70 is further mounted on a housing 50.

FIG. 7B is a typical side view illustrating a state where the lens holder 60, having the first objective lens 18 and the second objective lens 38 mounted thereon, is mounted on the actuator unit 70 and the actuator unit 70 is further mounted on the housing 50. In FIG. 7B, an arrow X represents the radial direction of the information recording medium 5. The rotation center of the information recording medium 5 lies in the +X direction. On the other hand, an arrow Y represents the direction perpendicular to the recording surface of the information recording medium 5. In FIG. 7B, the inclination angles of the first objective lens 18 and the second objective lens 38 and the inclination angle of the actuator unit 70 are illustrated more emphatically than the actual angles.

As shown in FIG. 7B, the actuator unit 70 is fixed to the housing 50 such that the optical axis of the first objective lens 18 toward the recording surface of the information recording medium 5 is inclined at the first inclination angle in the direction opposite to that of the rotation center of the information recording medium 5. An adhesive agent including viscosity such as an epoxy adhesive and an acrylic adhesive is employed as adhesive agents 80 and 81 which are used for fixing the actuator unit 70.

Here, in the case where the objective lens is fixed to the lens holder 60 such that the optical axis of the lens is inclined at a predetermined angle relative to the optical axis of the lens holder 60, such a case is susceptible to an effect of property of an adhesive agent used for fixing, an effect of gravity affecting the adhesive agent, an effect of ambient environment such as temperature, etc., and thus, there is a limit to securing of the accuracy of the inclination angle of the optical axis. In particular, it becomes difficult to secure the accuracy of the inclination angle of the optical axis in such an objective lens that the coma aberration is greatly changes according to change in the inclination angle, such as an objective to be lens used for the recording/reproduction of the optical disc supporting the BD standard or the HD-DVD standard.

However, in the optical pickup apparatus 1 according to an embodiment of the present invention, since the first objective lens 18 is mounted on the lens holder 60 such that the optical axis of the lens coincides with the optical axis of the first lens barrel 61, as described above, the directional accuracy of the optical axis can be easily secured. That is, the first objective lens 18 can be fixed to the lens holder 60 with accuracy by a simple method such as a method, by which the lens holder 60 is held such that the optical axis of the first lens barrel 61 becomes vertical and the first objective lens 18 is fixed to the end face of the first lens barrel 61 with the optical axis of the lens kept vertical.

According to the optical pickup apparatus 1 of an embodiment of the present invention, the optical axis adjustment and the coma aberration correction of the first objective lens 18 makes it possible to simultaneously correct the coma aberration of the second objective lens 38 as well. Therefore, the manufacturing process and the adjustment process are simplified so that the manufacturing efficiency of the optical pickup apparatus 1 can be improved. The objective lens with great coma aberration such as the objective lens to be used for the recording/reproduction of the optical disc supporting the BD standard or the HD-DVD standard can also be fully utilized without a decrease in the efficiency of the optical pickup apparatus 1.

In the optical pickup apparatus 1 according to an embodiment of the present invention, since each of the first objective lens 18 and the second objective lens 38 is mounted on the lens holder 60 such that the direction, in which the wavefront of the coma aberration on each lens face is most advanced in phase coincides with the radial direction, no coma aberration is caused in a beam direction (tangential direction) basically. Thus, a high degree of accuracy can be maintained in the optical system of the optical pickup apparatus 1.

In FIG. 7A, when the first inclination angle of the first objective lens 18 is 0.4° and the second inclination angle of the second objective lens 38 is 0.1°, for example, the inclination angle in the radial direction of the optical axis of the first objective lens 18 relative to the optical axis of the first lens barrel 61 is 0.0°, and the inclination angle in the radial direction (direction of the rotation center) of the optical axis of the second objective lens 38 relative to the optical axis of the second lens barrel 62 is (0.4°−0.1°=0.3°). In this case, in FIG. 7B, after the actuator unit 70 has been inclined so as to properly correct the coma aberration of the first objective lens 18, the inclination angle of the first objective lens 18 relative to the direction perpendicular to the recording surface of the information recording medium 5 is 0.4° (=first inclination angle) and the inclination angle of the second objective lens 38 relative to the direction perpendicular to the recording surface of the information recording medium is 0.1° (=second inclination angle).

Second Embodiment

Figure 9A:
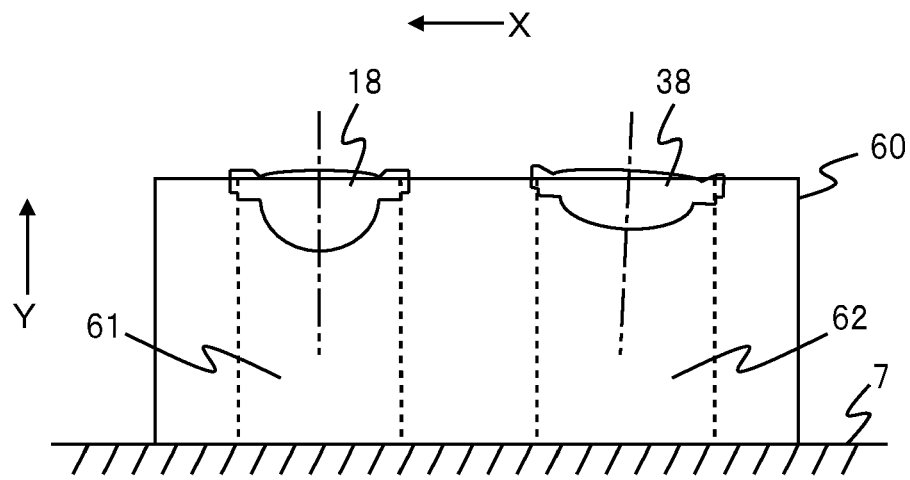
FIG. 9A is a typical side view illustrating a state where a first objective lens 18 and a second objective lens 38 are mounted on a lens holder 60 in a second embodiment of the present invention.
Figure 9B:
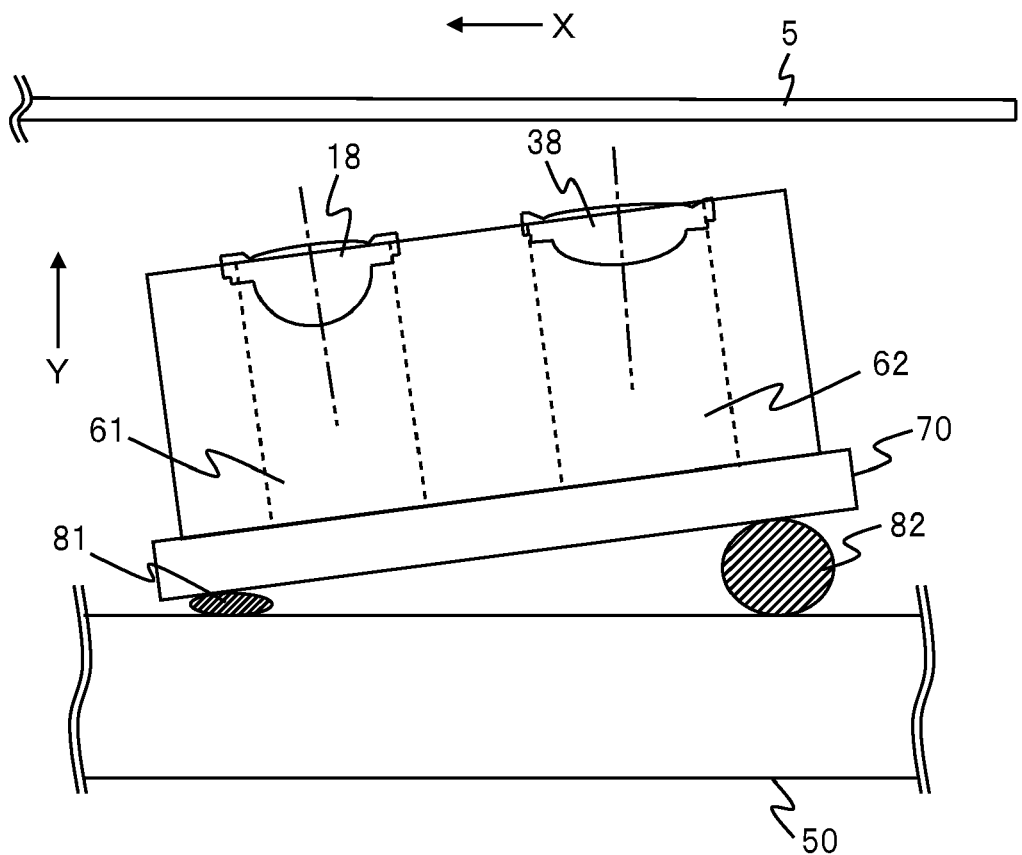
FIG. 9B is a typical side view illustrating a state where a lens holder 60 having a first objective lens 18 and a second objective lens 38 mounted thereon is mounted on a actuator unit 70, and a actuator unit 70 is further mounted on a housing 50 in a second embodiment of the present invention.

FIG. 9A is a typical side view illustrating a state where the first objective lens 18 and the second objective lens 38 are mounted on the lens holder 60 in the optical pickup apparatus 1 which will be described as a second embodiment of the present invention. FIG. 9B is a typical side view illustrating a state where the lens holder 60, having the first objective lens 18 and the second objective lens 38 mounted thereon, is mounted on the actuator unit 70 and the actuator unit 70 is further mounted on the housing 50 in the optical pickup apparatus 1 which will be described as a second embodiment of the present invention. In FIGS. 9A and 9B, the inclination angles of the first objective lens 18 and the second objective lens 38 and the inclination angle of the actuator unit 70 are illustrated more emphatically than the actual angles.

In a first embodiment of the present invention, each of the first objective lens 18 and the second objective lens 38 is fixed to the lens holder 60 such that the direction, in which the wavefront of the coma aberration on each lens face is most advanced in phase, is aligned with (directed in) the direction of the rotation center of the information recording medium 5. In a second embodiment of the present invention, each of the first objective lens 18 and the second objective lens 38 is fixed to the lens holder 60 such that the direction, in which the wavefront of the coma aberration on each lens face is most advanced in phase, is aligned with (directed in) the direction opposite to that of the rotation center of the information recording medium 5.

As shown in FIG. 9A, the first objective lens 18 is fixed to the lens holder 60 such that the direction of the optical axis thereof toward the recording surface of the information recording medium 5 coincides with the optical axis of the first lens barrel 61. On the other hand, the second objective lens 38 is fixed to the lens holder 60 such that the optical axis of the lens toward the recording surface of the information recording medium 5 becomes in the following direction.

That is, assuming that a inclination angle of the optical axis of the first objective lens 18 required to cancel the coma aberration of the first objective lens 18 to the recording surface of the information recording medium 5 is a first inclination angle, and that an inclination angle of the optical axis of the second objective lens 38 required to cancel the coma aberration of the second objective lens 38 to the recording surface of the information recording medium 5 is a second inclination angle (first inclination angle>second inclination angle), the second objective lens 38 is mounted on the lens holder 60 such that the optical axis thereof is inclined in the direction opposite to that of the rotation center of the information recording medium 5 (+X direction) at an angle corresponding to a difference between the first inclination angle and the second inclination angle (first inclination angle minus second inclination angle), relative to the optical axis of the second lens barrel 62.

On the other hand, as shown in FIG. 9B, the actuator unit 70 is fixed to the housing 50 such that the optical axis of the first objective lens 18 toward the recording surface of the information recording medium 5 is inclined at the first inclination angle in the direction of the rotation center of the information recording medium 5.

As above, each of the first objective lens 18 and the second objective lens 38 can be fixed to the lens holder 60 also such that the direction, in which the wavefront of the coma aberration on each lens face is most advanced in phase is aligned with (directed in) the direction opposite to that of the rotation center of the information recording medium 5. Even with such a configuration, the same effect can be obtained as in the case of a first embodiment of the present invention.

In FIG. 9A, when the first inclination angle of the first objective lens 18 is 0.4° and the second inclination angle of the second objective lens 38 is 0.1°, for example, the inclination angle in the radial direction of the optical axis of the first objective lens 18 relative to the optical axis of the first lens barrel 61 is 0.0°, and the inclination angle in the radial direction (direction of the rotation center) of the optical axis of the second objective lens 38 relative to the optical axis of the second lens barrel 62 is (0.4°−0.1°=0.3°). In this case, in FIG. 9B, after the actuator unit 70 has been inclined so as to properly correct the coma aberration of the first objective lens 18, the inclination angle of the first objective lens 18 relative to the direction perpendicular to the recording surface of the information recording medium 5 is 0.4° (=first inclination angle) and the inclination angle of the second objective lens 38 relative to the direction perpendicular to the recording surface of the information recording medium is 0.1° (=second inclination angle).

Third Embodiment

Figure 10A:
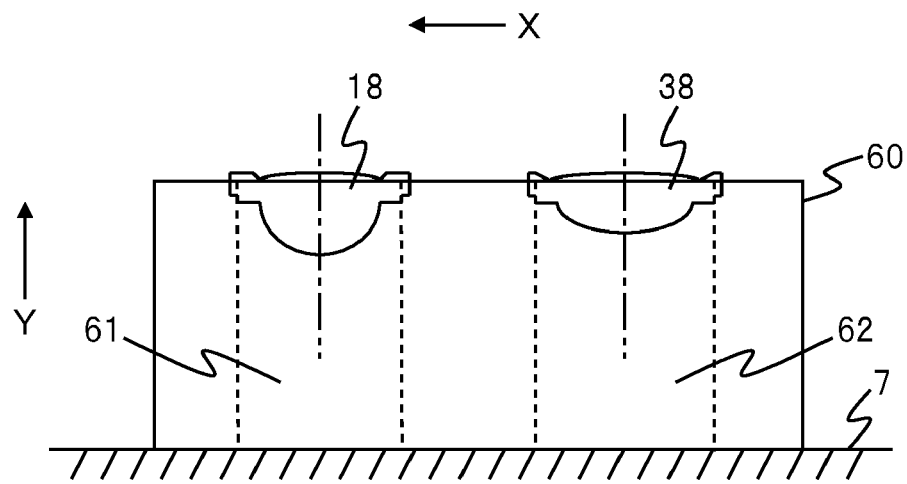
FIG. 10A is a typical side view illustrating a state where a first objective lens 18 and a second objective lens 38 are mounted on a lens holder 60 in a third embodiment of the present invention.
Figure 10B:
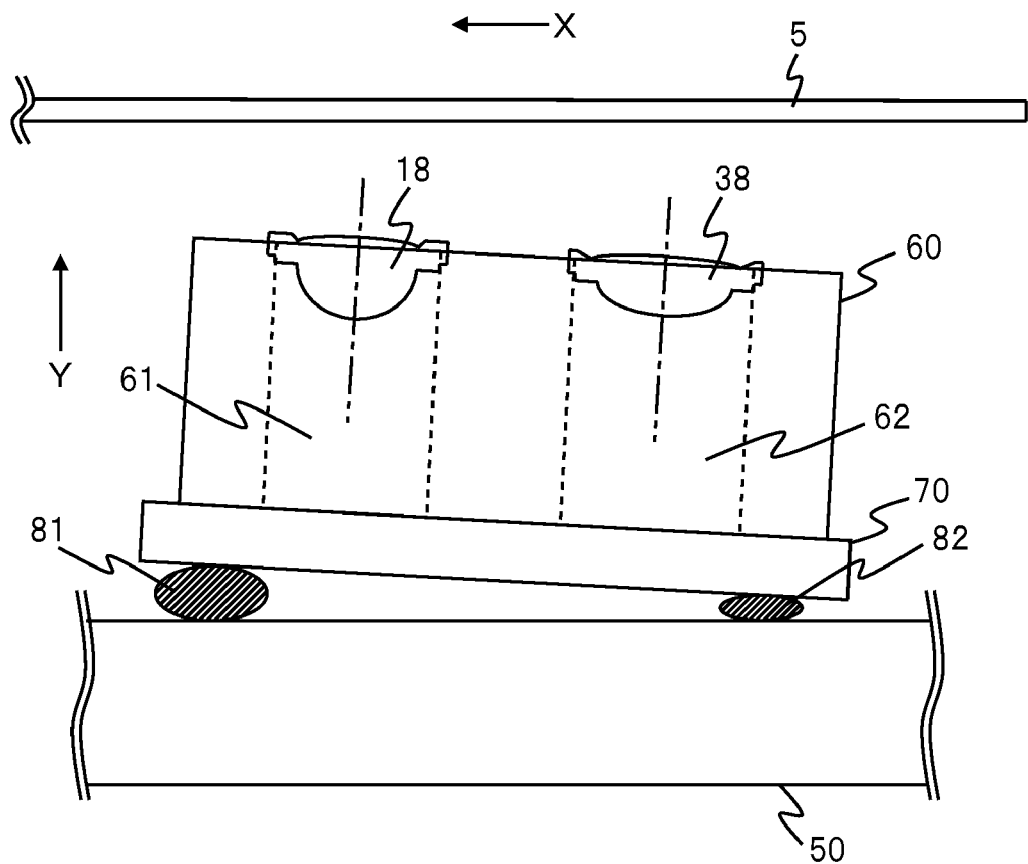
FIG. 10B is a typical side view illustrating a state where a lens holder 60 having a first objective lens 18 and a second objective lens 38 mounted thereon is mounted on an actuator unit 70, and an actuator unit 70 is further mounted on a housing 50 in a third embodiment of the present invention.

FIG. 10A is a typical side view illustrating a state where the first objective lens 18 and the second objective lens 38 are mounted on the lens holder 60 in the optical pickup apparatus 1 which will be described as a third embodiment of the present invention. FIG. 10B is a typical side view illustrating a state where the lens holder 60, having the first objective lens 18 and the second objective lens 38 mounted thereon, is mounted on the actuator unit 70 and the actuator unit 70 is further mounted on the housing 50 in the optical pickup apparatus 1 which will be described as a third embodiment of the present invention. In FIGS. 10A and 10B, the inclination angles of the first objective lens 18 and the second objective lens 38 and the inclination angle of the actuator unit 70 are illustrated more emphatically than the actual angles.

In a third embodiment of the present invention, as in a first embodiment of the present invention, each of the first objective lens 18 and the second objective lens 38 is fixed to the lens holder 60 such that the direction, in which the wavefront of the coma aberration on each lens face is most advanced in phase on each lens face is aligned with (directed in) the direction of the rotation center of the information recording medium 5.

As in a first embodiment of the present invention, the first objective lens 18 is fixed to the lens holder 60 such that the direction of the optical axis thereof toward the recording surface of the information recording medium 5 coincides with the optical axis of the first lens barrel 61. On the other hand, in contrast to a first embodiment of the present invention, the second objective lens 38 is fixed to the lens holder 60 such that the direction of the optical axis of the lens toward the recording surface of the information recording medium 5 coincides with the optical axis of the second lens barrel 62, in the same manner as in the case of the first objective lens 18.

Here, a third embodiment of the present invention is an embodiment, which is applicable when the change in the coma aberration according to the change in the inclination of the optical axis of the second objective lens 38, is small enough as compared with the change in the coma aberration according to the change in the inclination of the optical axis of the first objective lens 18. That is, in such a case, when the actuator unit 70 is fixed to the housing 50, even if the actuator unit 70 is inclined by such a predetermined amount that the coma aberration of the first objective lens 18 is cancelled, the change in the coma aberration of the second objective lens 38 is negligible. For example, in the case where the first objective lens 18 is the objective lens for the DB standard and the second objective lens 38 is the objective lens for the DVD/CD standard, the change in the coma aberration according to the change in the optical axis in the second objective lens 38 is smaller than that in the first objective lens 18. Thus, even if the second objective lens 38 is mounted on the lens holder 60 such that the optical axis of the lens toward the recording surface of the information recording medium 5 coincides with the optical axis of the second lens barrel 62, an error of the optical system in the optical pickup apparatus 1 can be kept within an allowable range. By mounting the second objective lens 38 on the lens holder 60 such that the optical axis of the lens coincides with the optical axis of the second lens barrel 62, it becomes possible to fix the second objective lens 38 with accuracy by a simple method in the same manner as in the case of the first objective lens 18. Therefore, simplification and labor savings can be achieved in the manufacturing/adjustment process of the optical pickup apparatus 1.

In FIG. 10A, when the first inclination angle of the first objective lens 18 is 0.4° and the second inclination angle of the second objective lens 38 is 0.1°, for example, the inclination angle in the radial direction of the optical axis of the first objective lens 18 relative to the optical axis of the first lens barrel 61 is 0.0° and the inclination angle in the radial direction (direction of the rotation center) of the optical axis of the second objective lens 38 relative to the optical axis of the second lens barrel 62 is also 0.0°. In this case, in FIG. 10B, after the actuator unit 70 has been inclined so as to properly correct the coma aberration of the first objective lens 18, the inclination angle of the first objective lens 18 relative to the direction perpendicular to the recording surface of the information recording medium 5 is 0.4° (=first inclination angle) and the inclination angle of the second objective lens 38 relative to the direction perpendicular to the recording surface of the information recording medium is also 0.4° (≠second inclination angle).

The first inclination angle of the first objective lens 18 may be an angle obtained based on the mean value of the coma aberrations of a plurality of first objective lenses 18 (e.g., mean value of the coma aberrations in production lots of the first objective lens 18). Adoption of such mean value makes it possible to set the first inclination angle uniformly for the plurality of first objective lenses 18 in the production lots when the optical pickup apparatus 1 is mass produced. Thus, there can be saved a work of obtaining the first inclination angles corresponding to the coma aberrations of individual first objective lenses 18, a work of performing optical axis adjustment of the individual first objective lenses 18 (optical axis adjustment when the actuator unit 70 is fixed to the housing 50) so that the obtained first inclination angles can be achieved, and the like. Therefore, the manufacturing efficiency of the optical pickup apparatus 1 can be further improved.

Fourth Embodiment

Figure 11A:
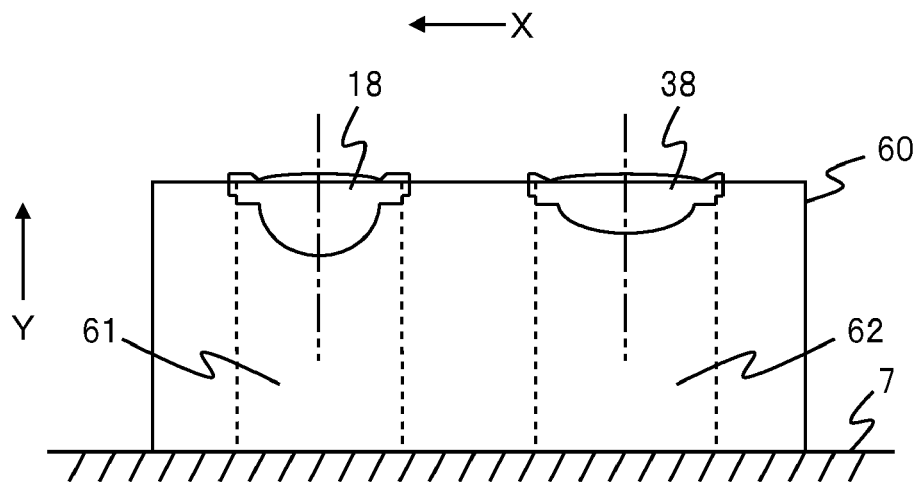
FIG. 11A is a typical side view illustrating a state where a first objective lens 18 and a second objective lens 38 are mounted on a lens holder 60 in a fourth embodiment of the present invention.
Figure 11B:
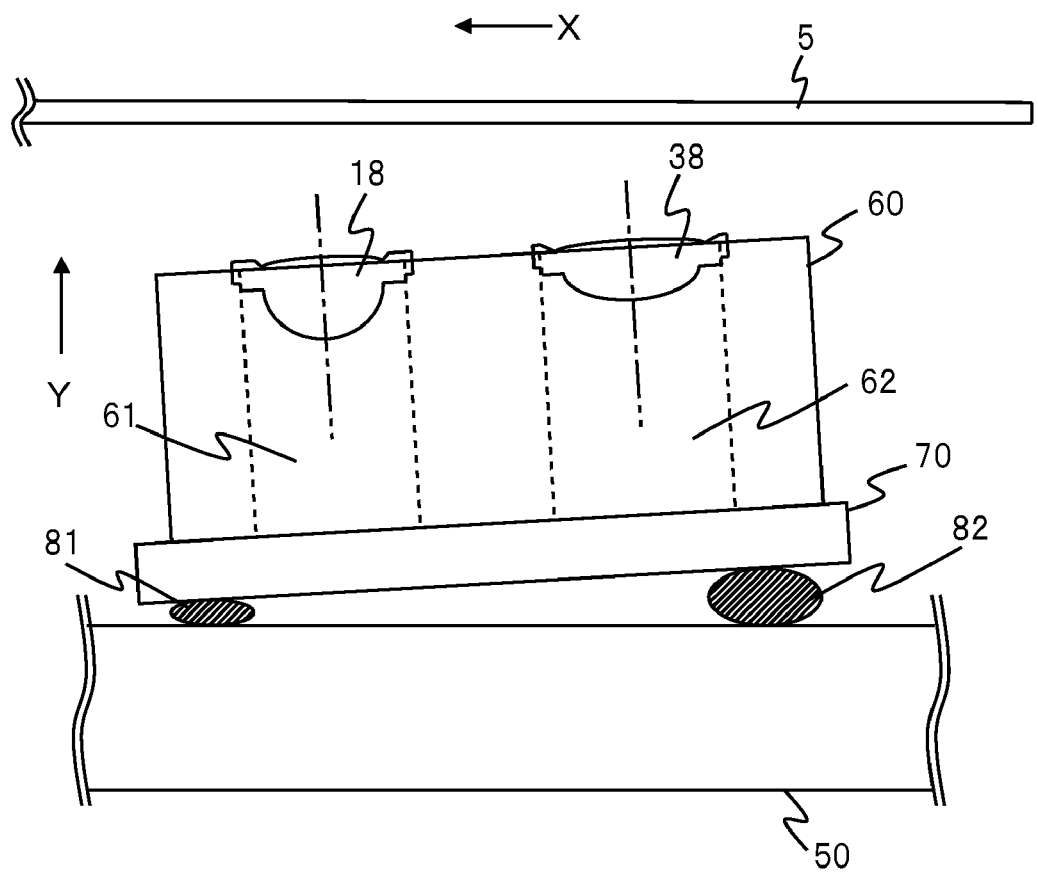
FIG. 11B is a typical side view illustrating a state where a lens holder 60 having a first objective lens 18 and a second objective lens 38 mounted thereon is mounted on an actuator unit 70, and an actuator unit 70 is further mounted on a housing 50 in a fourth embodiment of the present invention.
Figure 12:
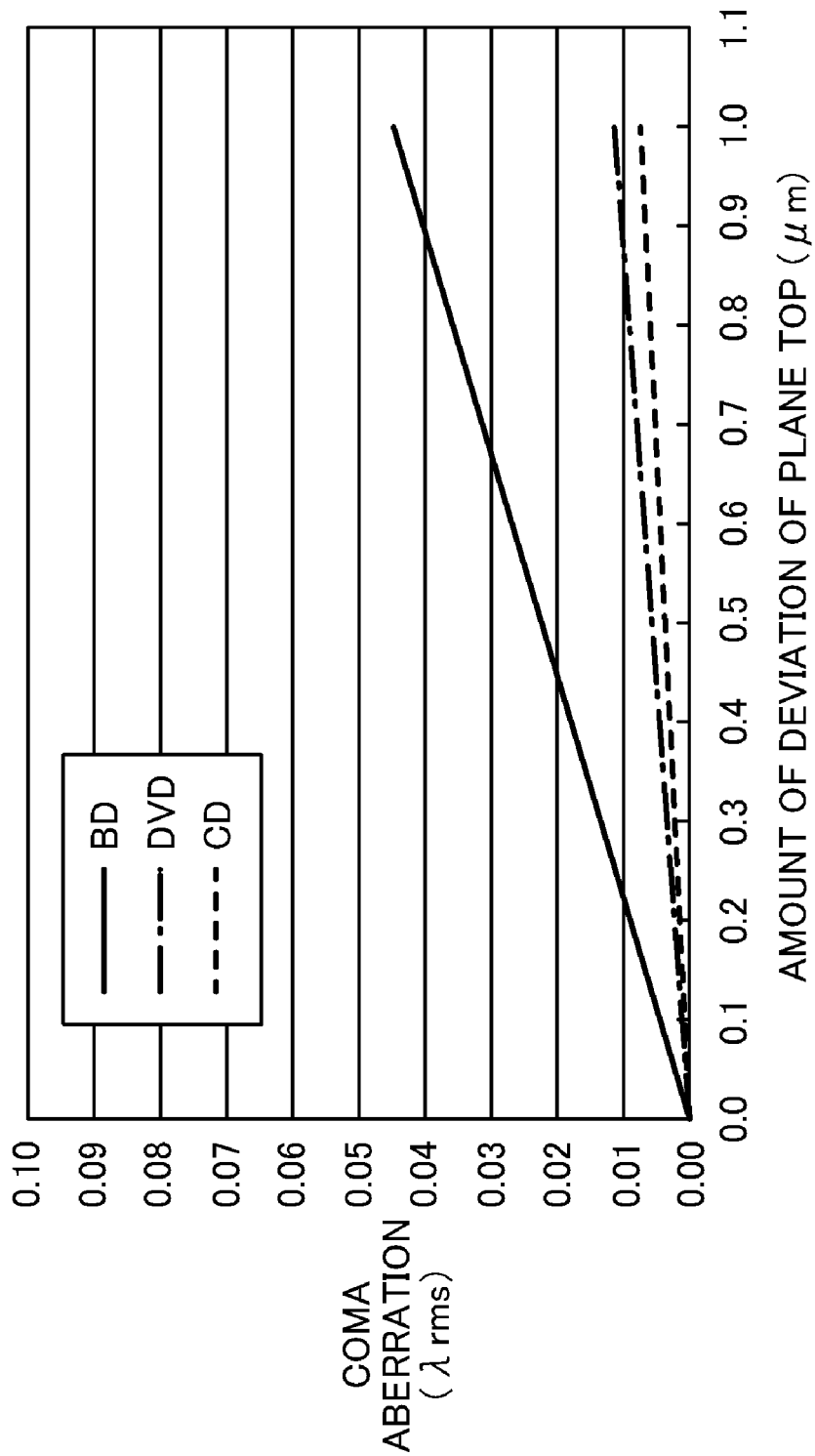
FIG. 12 is a graph illustrating a relationship between an amount of deviation of a plane top and coma aberration.

FIG. 11A is a typical side view illustrating a state where the first objective lens 18 and the second objective lens 38 are mounted on the lens holder 60 in the optical pickup apparatus 1 which will be described as a fourth embodiment of the present invention. FIG. 11B is a typical side view illustrating a state where the lens holder 60, having the first objective lens 18 and the second objective lens 38 mounted thereon, is mounted on the actuator unit 70 and the actuator unit 70 is further mounted on the housing 50 in the optical pickup apparatus 1 which will be described as a fourth embodiment of the present invention. A fourth embodiment of the present invention is an embodiment obtained by applying a third embodiment thereof based on a second embodiment thereof. In FIGS. 11A and 11B, the inclination angles of the first objective lens 18 and the second objective lens 38 and the inclination angle of the actuator unit 70 are illustrated more emphatically than the actual angles.

In a fourth embodiment of the present invention, as in a second embodiment thereof, each of the first objective lens 18 and the second objective lens 38 is fixed to the lens holder 60 such that the direction, in which the wavefront of the coma aberration on each lens face is most advanced in phase, is aligned with (directed in) the direction opposite to that of the rotation center of the information recording medium 5. In a fourth embodiment of the present invention, as in a third embodiment thereof, the second objective lens 38 is fixed to the lens holder 60 such that the direction of the optical axis of the lens toward the recording surface of the information recording medium 5 coincides with the optical axis of the second lens barrel 62, in the same manner as in the case of the first objective lens 18.

Thus, the same configuration as that of a third embodiment of the present invention can also be applied to the case where each of the first objective lens 18 and the second objective lens 38 is fixed to the lens holder 60 such that the direction, in which the wavefront of the coma aberration on each lens face is most advanced in phase, is aligned with (directed in) the direction opposite to that of the rotation center of the information recording medium 5, in the same manner as in a second embodiment of the present invention. With the configuration of a fourth embodiment of the present invention as well, the same effect as that in the case of a third embodiment of the present invention can be obtained.

In General, when the objective lens is to be mounted on the lens holder in a state where the optical axis thereof is inclined at a predetermined angle relative to the optical axis of the lens holder, a delicate work is required for maintaining the accuracy in the direction of the optical axis due to a difference in the adhesive condition and the work environment for fixing the objective lens to the lens holder. According to an embodiment of the present invention, since the optical axis of the first objective lens is caused to coincide with the optical axis of the first lens barrel, the first objective lens can be mounted on the lens holder with accuracy and with ease by a simple method such as a method by which the lens holder is held such that the optical axis of the first lens barrel becomes vertical and the first objective lens is fixed to the end face of the first lens barrel with the optical axis of the lens kept vertical. For this reason, the objective lens with great coma aberration such as the objective lens to be used for the recording/reproduction of the optical disc supporting the BD standard or the HD-DVD standard can also be fully utilized without a decrease in the efficiency of the optical pickup apparatus 1.

In an embodiment of the present invention, each of the first objective lens and the second objective lens is mounted on the lens holder such that the direction, in which the wavefront of the coma aberration on each lens face is most advanced in phase, coincides with the radial direction, thereby causing no coma aberration in the beam direction (tangential direction of the information recording medium (optical disc)).

When the mean value in the production lots, etc., can be obtained with respect to the first inclination angle of the first objective lens, the mean value can be adopted as the first inclination angle. Adoption of the mean value makes it possible to set the first inclination angle uniformly for a plurality of first objective lenses and significantly simplify, and save labor of, the manufacturing/adjustment process of the optical pickup apparatus, as compared with the case where the first inclination angle inherent for each of the first objective lenses is set. Therefore, the manufacturing efficiency of the optical pickup apparatus can be improved.

For example, in the case where the first objective lens is the objective lens for the DB standard and the second objective lens is the objective lens for the DVD/CD standard, the change in the coma aberration according to the change in the optical axis in the second objective lens is smaller than that in the first objective lens. Thus, even if the second objective lens is mounted on the lens holder such that the optical axis of the lens toward the recording surface of the information recording medium coincides with the optical axis of the second lens barrel, an error of the optical system in the optical pickup apparatus can be kept within an allowable range. By mounting the second objective lens on the lens holder such that the optical axis of the lens coincides with the optical axis of the second lens barrel, it becomes possible to fix the second objective lens with accuracy by a simple method in the same manner as in the case of the first objective lens. Therefore, simplification and labor savings can be achieved in the manufacturing/adjusting process of the optical pickup apparatus.

According to an embodiment of the present invention, it becomes possible to produce the optical pickup apparatus with the simple adjusting/manufacturing process with the coma aberration of the plurality of objective lenses being properly corrected.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. An optical pickup apparatus configured to apply a light flux to an information recording medium to be rotated and detect the light flux reflected from the information recording medium, comprising:
   a first objective lens configured to focus the light flux on the information recording medium;
   a second objective lens configured to focus the light flux on the information recording medium;
   a lens holder including a first lens barrel having the first objective lens mounted on an end face thereof and a second lens barrel having the second objective lens mounted on an end face thereof;
   an actuator unit having the lens holder mounted thereon; and
   a housing having the actuator unit mounted thereon,
   the first objective lens and the second objective lens each being mounted on the lens holder such that a direction in which a wavefront of coma aberration of the first lens is most advanced in phase and a direction in which a wavefront of coma aberration of the second lens is most advanced in phase are both aligned with a radial direction of the information recording medium,
   the actuator unit being mounted on the housing such that an optical axis of the first objective lens is inclined in the radial direction at an inclination angle of the optical axis thereof toward a recording surface of the information recording medium which angle is required to cancel coma aberration of the first objective lens to the recording surface.

2. An optical pickup apparatus configured to apply a light flux to an information recording medium to be rotated and detect the light flux reflected from the information recording medium, comprising:
   a first objective lens configured to focus the light flux on the information recording medium;
   a second objective lens configured to focus the light flux on the information recording medium;
   a lens holder including a first lens barrel having the first objective lens mounted on an end face thereof and a second lens barrel having the second objective lens mounted on an end face thereof;
   an actuator unit having the lens holder mounted thereon; and
   a housing having the actuator unit mounted thereon,
   the first objective lens and the second objective lens each being mounted on the lens holder such that a direction in which a wavefront of coma aberration of the first lens is most advanced in phase and a direction in which a wavefront of coma aberration of the second lens is most advanced in phase are both aligned with a radial direction of the information recording medium,
   the first objective lens being mounted on the lens holder such that an optical axis of the first objective lens toward a recording surface of the information recording medium coincides with an optical axis of the first lens barrel,
   the second objective lens being mounted on the lens holder such that an optical axis of the second objective lens is inclined in the radial direction at an angle corresponding to a difference (first inclination angle minus second inclination angle) between a first inclination angle and a second inclination angle, relative to an optical axis of the second lens barrel, the first inclination angle being an inclination angle of the optical axis of the first objective lens required to cancel coma aberration of the first objective lens to the recording surface, the second inclination angle being an inclination angle of the optical axis of the second objective lens toward the recording surface required to cancel coma aberration of the second objective lens to the recording surface, wherein the first inclination angle is greater than the second inclination angle,
   the actuator unit being mounted on the housing such that the optical axis of the first objective lens is inclined in the radial direction at the first inclination angle.

3. The optical pickup apparatus of claim 2, wherein the first inclination angle is an angle obtained based on a mean value of the coma aberrations of a plurality of first objective lenses.

4. The optical pickup apparatus of claim 2, wherein the second objective lens is mounted on the lens holder such that the optical axis of the second objective lens toward the recording surface of the information recording medium coincides with the optical axis of the second lens barrel.

5. The optical pickup apparatus of claim 2, wherein the first objective lens includes an objective lens for BD standard or HD-DVD standard, and wherein the second objective lens includes an objective lens for the DVD/CD standard.

6. An optical pickup apparatus configured to apply a light flux to an information recording medium to be rotated and detect the light flux reflected from the information recording medium, comprising:
   a first objective lens configured to focus the light flux on the information recording medium;
   a second objective lens configured to focus the light flux on the information recording medium;
   a lens holder including a first lens barrel having the first objective lens mounted on an end face thereof and a second lens barrel having the second objective lens mounted on an end face thereof;

an actuator unit having the lens holder mounted thereon; and a housing having the actuator unit mounted thereon, the first objective lens and the second objective lens each being mounted on the lens holder such that a direction in which a wavefront of coma aberration of the first lens is most advanced in phase and a direction in which a wavefront of coma aberration of the second lens is most advanced in phase are both aligned with a radial direction of the information recording medium, the first objective lens being mounted on the lens holder such that an optical axis of the first objective lens toward a recording surface of the information recording medium coincides with an optical axis of the first lens barrel, the second objective lens being mounted on the lens holder such that an optical axis of the second objective lens is inclined in the direction of the center of rotation at an angle corresponding to a difference (first inclination angle minus second inclination angle) between a first inclination angle and a second inclination angle relative to an optical axis of the second lens barrel, the first inclination angle being an inclination angle of the optical axis of the first objective lens required to cancel coma aberration of the first objective lens to the recording surface, the second inclination angle being an inclination angle of the optical axis of the second objective lens toward the recording surface required to cancel coma aberration of the second objective lens to the recording surface, wherein the first inclination angle is greater than the second inclination angle, the actuator unit being mounted on the housing such that the optical axis of the first objective lens is inclined in a direction opposite to the direction of the center of rotation at the first inclination angle.

7. The optical pickup apparatus of claim 6, wherein the first inclination angle is an angle obtained based on a mean value of the coma aberrations of a plurality of first objective lenses.

8. The optical pickup apparatus of claim 6, wherein the second objective lens is mounted on the lens holder such that the optical axis of the second objective lens toward the recording surface of the information recording medium coincides with the optical axis of the second lens barrel.

9. The optical pickup apparatus of claim 6, wherein the first objective lens includes an objective lens for BD standard or HD-DVD standard, and wherein the second objective lens includes an objective lens for the DVD/CD standard.

10. An optical pickup apparatus configured to apply a light flux to an information recording medium to be rotated and detect the light flux reflected from the information recording medium, comprising:

a first objective lens configured to focus the light flux on the information recording medium;

a second objective lens configured to focus the light flux on the information recording medium;

a lens holder including a first lens barrel having the first objective lens mounted on an end face thereof and a second lens barrel having the second objective lens mounted on an end face thereof;

an actuator unit having the lens holder mounted thereon; and a housing having the actuator unit mounted thereon, the first objective lens and the second objective lens each being mounted on the lens holder such that a direction in which a wavefront of coma aberration of the first lens is most advanced in phase and a direction in which a wavefront of coma aberration of the second lens is most advanced in phase are both aligned with a radial direction of the information recording medium, the first objective lens being mounted on the lens holder such that an optical axis of the first objective lens toward a recording surface of the information recording medium coincides with an optical axis of the first lens barrel, the second objective lens being mounted on the lens holder such that an optical axis of the second objective lens is inclined in the direction opposite to the direction of the center of rotation at an angle corresponding to a difference (first inclination angle minus second inclination angle) between a first inclination angle and a second inclination angle relative to an optical axis of a second lens barrel, the first inclination angle being an inclination angle of the optical axis of the first objective lens required to cancel the coma aberration of the first objective lens to the recording surface, the second inclination angle being an inclination angle of the optical axis of the second objective lens toward the recording surface required to cancel the coma aberration of the second objective lens to the recording surface, wherein the first inclination angle is greater than the second inclination angle, the actuator unit being mounted on the housing such that the optical axis of the first objective lens is inclined in the direction of the center of rotation at the first inclination angle.

11. The optical pickup apparatus of claim 10, wherein the first inclination angle is an angle obtained based on a mean value of the coma aberrations of a plurality of first objective lenses.

12. The optical pickup apparatus of claim 10, wherein the second objective lens is mounted on the lens holder such that the optical axis of the second objective lens toward the recording surface of the information recording medium coincides with the optical axis of the second lens barrel.

13. The optical pickup apparatus of claim 10, wherein the first objective lens includes an objective lens for BD standard or HD-DVD standard, and wherein the second objective lens includes an objective lens for the DVD/CD standard.

14. A method of manufacturing an optical pickup apparatus configured to a light flux to an information recording medium to be rotated and detect the light flux reflected from the information recording medium, the optical pickup apparatus including a first objective lens configured to focus the light flux on the information recording medium, a second objective lens configured to focus the light flux on the information recording medium, a lens holder including a first lens barrel having the first objective lens mounted on an end face thereof and a second lens barrel having the second objective lens mounted on an end face thereof, an actuator unit having the lens holder mounted thereon, and a housing having the actuator unit mounted thereon, the method comprising:

mounting the first objective lens and the second objective lens on the lens holder such that a direction in which a wavefront of coma aberration of the first lens is most advanced in phase and a direction in which a wavefront of coma aberration of the second lens is most advanced in phase are both aligned with a radial direction of the information recording medium;

mounting the first objective lens on the lens holder such that an optical axis of the first objective lens toward a recording surface of the information recording medium coincides with an optical axis of the first lens barrel;

mounting the second objective lens on the lens holder such that an optical axis of the second objective lens is inclined in the radial direction at an angle corresponding to a difference (first inclination angle minus second inclination angle) between a first inclination angle and a second inclination angle relative to an optical axis of a second lens barrel, the first inclination angle being an inclination angle of the optical axis of the first objective lens required to cancel the coma aberration of the first objective lens to the recording surface, the second inclination angle being an inclination angle of the optical axis of the second objective lens toward the recording surface required to cancel the coma aberration of the second objective lens to the recording surface, wherein the first inclination angle is greater than the second inclination angle; and mounting the actuator unit on the housing such that the optical axis of the first objective lens is inclined in the radial direction by the first inclination angle in the radial direction.

* * * * *